(12) United States Patent
Frerking et al.

(10) Patent No.: US 8,670,355 B1
(45) Date of Patent: Mar. 11, 2014

(54) SYSTEM AND METHOD FOR NETWORK BASED HEARING AID COMPATIBLE MODE SELECTION

(75) Inventors: Melvin Duane Frerking, Eastman, GA (US); George O'Quinn Hirvela, Carrollton, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1598 days.

(21) Appl. No.: 11/874,225

(22) Filed: Oct. 18, 2007

(51) Int. Cl.
*H04L 12/16* (2006.01)
*H04M 11/00* (2006.01)
*H04R 25/00* (2006.01)
*H04B 1/10* (2006.01)
*H04B 15/02* (2006.01)

(52) U.S. Cl.
USPC ............ 370/271; 370/259; 370/252; 379/52; 381/23.1; 381/312; 455/63.1; 455/296; 455/414.1

(58) Field of Classification Search
None
See application file for complete search history.

(56) References Cited

U.S. PATENT DOCUMENTS

| | | | |
|---|---|---|---|
| 6,009,311 A * | 12/1999 | Killion et al. | 455/63.1 |
| 6,122,500 A * | 9/2000 | Dent et al. | 455/414.1 |
| 6,414,948 B1 * | 7/2002 | Sato | 370/335 |
| 7,245,730 B2 | 7/2007 | Enzmann | |
| 8,018,881 B2 * | 9/2011 | Nesargi et al. | 370/310 |
| 2001/0044293 A1 * | 11/2001 | Morgan | 455/405 |
| 2002/0002052 A1 * | 1/2002 | McHenry | 455/447 |
| 2005/0070322 A1 * | 3/2005 | Tayloe et al. | 455/522 |
| 2006/0188116 A1 | 8/2006 | Frerking | |
| 2007/0076897 A1 * | 4/2007 | Philipp | 381/74 |
| 2007/0206505 A1 * | 9/2007 | Forbes | 370/252 |
| 2007/0230728 A1 | 10/2007 | Enzmann | |

* cited by examiner

*Primary Examiner* — Marsha D Banks Harold
*Assistant Examiner* — Matthew Campbell
(74) *Attorney, Agent, or Firm* — Parks IP Law LLC; Mickki D. Murray, Esq.

(57) ABSTRACT

A system and method for providing a hearing aid compatibility mode of communication service to hearing aid users is disclosed. The described system can store an indication at a communication network that a given account is used by a person who wears hearing aid equipment. Services provided to that account can then use communication parameters and network resources which tend to minimize interference with a hearing aid. The network can instruct the user equipment and the radio access network to communicate using hearing aid friendly parameters. In some cases, network resources beyond those allocated for accounts not indicated as hearing aid user accounts can be allocated. Parameters adjusted in hearing aid compatibility mode can include codec rates, operating power levels, and burst frame length, among others. In some described embodiments, the hearing aid compatibility mode can be selectively enabled as desired by an account user.

22 Claims, 11 Drawing Sheets

SYSTEM AND METHOD FOR NETWORK BASED HEARING AID COMPATIBLE MODE SELECTION

TECHNICAL FIELD

This invention relates generally to mobile network communication device compatibility with hearing assistive devices. More specifically, it relates to the selection of network and handset operating modes that enhance compatibility between mobile communication devices and hearing assistive devices.

BACKGROUND

Hearing assistive systems are used to assist the hearing impaired to best compensate for a user's hearing loss profile. Hearing assistive systems can include hearing aids, cochlear implants, and related devices. In simple terms a hearing aid is a device worn by a user to pick up and amplify sound and provide it to a user's ear canal. Hearing aid technology has continually improved, resulting in ever smaller devices which are often categorized by how they fit about a user's ear. For example, some common hearing aid styles listed by decreasing size include behind-the-ear (BTE), in-the-ear (ITE), in-the-canal (ITC), mostly-in-the-canal (MIC) and completely-in-the-canal (CIC) hearing aids.

Hearing aids worn outside the ear and cochlear implant input devices operate in either a microphone mode, in which sound waves incident upon the device are converted to electrical energy, or a telecoil mode, in which magnetic energy is converted to electrical energy. In either mode, the resultant electrical signal is subsequently amplified, processed, and output to the user. When a hearing aid operates in an environment that includes a modulated RF field or a fluctuating magnetic field, undesired interference may be induced in the hearing aid circuitry as the varying fields are detected and processed as electrical signals by the hearing aid.

Mobile communication devices have now become commonplace, and interference generated by these devices continues to pose challenges for hearing aid designers. Use of a mobile communication device commonly involves placing it close to an ear so that sounds from a speaker can be heard. This placement often leads to a hearing aid of a user being located within a strong, interference-inducing RF field of the communication device. The problem is further exacerbated by the fact that interference generated by the now common digital communication devices such as digital cell phones is generally more obtrusive than that caused by their analog counterparts.

Digital wireless telephones transmit over a wireless network via radio waves. The radio waves generated by the digital telephone are typically detected and demodulated by the hearing aid circuitry, thereby introducing an interference signal to the hearing assistive device. The interference signal is then amplified, processed, and delivered to the user along with the desired signal. As a result, the audible quality of the desired signal is diminished. Digital wireless devices that employ time division multiplexed modulation schemes often generate interference due to the on/off keying of their modulation envelopes. The pulsing of the transmissions may produce interference at the fundamental frequencies associated with the pulse rates, as well as at the associated harmonic frequencies across the audible spectrum. Interference may also be produced by RF energy picked up by components of hearing assistive devices, such as a telecoil in a hearing aid.

The digital telephone's electronics, such as the backlighting, the display, the keypad, the battery leads and the circuit board often also generate pulsed magnetic fields. The resultant magnetic field energy typically impacts for example, a hearing aid's wiring and interconnections, to generate interference at the hearing aid. This type of interference, often referred to as baseband magnetic interference, is also converted to an electrical signal that is then processed by the hearing aid, amplified, and delivered to the hearing aid user along with the desired signal, such as the voice of a human speaker. In addition to digital cell phones, digital cordless phones, portable digital radios and other digital devices generate electromagnetic interference which, when processed by the hearing aid, is subsequently output to the user. Analog apparatus such as power transformers, fluorescent lighting, and power lines likewise produce electromagnetic field static that interferes with hearing assistive devices.

Electronic interference, whether generated by pulsating electric or magnetic fields, combines with the desired signals picked up by a microphone, telecoil, or circuitry to form a composite signal at the hearing assistive device. The composite signal is processed by the hearing assistive device and output to the user. Depending on the source and duration of the interference, the hearing assistive device performance may be noticeably and significantly reduced, to the point where the hearing impaired user is discouraged from either using the hearing assistive device, such as a hearing aid, or discouraged from using the item that generates the interference, such as a cellular telephone.

Due to the importance of accessible wireless communications for the hearing impaired, the Federal Communications Commission (FCC) has imposed a mandate for hearing aid compatibility (HAC) for wireless communications devices on both device manufacturers and service providers. Many of the solutions proposed for meeting these HAC requirements have focused primarily on handset-based solutions.

SUMMARY

The various embodiments of the present invention overcome the shortcomings of the prior art by providing a communication system that can offer services by reducing the potential for interference and enabling a hearing aid compatible (HAC) mode of operation. A communication system according to the present invention can comprise a host node, where the host node includes a memory for storing an account identifier in association with a hearing aid user indication. The indication can mark the account as being that of a hearing aid user. Services provided to the account can then be provided in a HAC mode of operation. Alternatively, or in addition, the memory can store an indication that the account is authorized to receive services in a HAC mode of operation if requested. In this case the system can be configured to receive and respond to HAC mode of operation requests from communication devices.

The communication system can be configured to instruct a communication device to communicate using one or more designated settings when a HAC mode of operation is enabled. The settings to be adjusted can include a codec rate, a burst frame length, error correction coding, operating power level, a frequency band, an antenna configuration, and display backlighting circuitry.

The communication system can be configured to cause the radio access network of the communication system to communicate with a communication device associated with the account using one or more designated settings when a HAC mode of operation is enabled. The settings to be adjusted can include a codec rate, a burst frame length, error correction coding, operating power level, a frequency band, an interference cancellation technique, and an antenna configuration.

The communication system can be configured to monitor the number of HAC mode users at a given cell site and/or sector to prevent the over allocation of network resources. The system can also be configured to increase timers to hold HAC mode calls during periods of high frame rate errors and configured to provide additional network resources to a HAC mode E911 call. An indication that a given account is to be provided a HAC mode of operation can be provided to other communication service providers to facilitate the use of a HAC mode while an audio communication device is roaming on that network.

A method of providing a hearing aid compatibility mode of operation in a communication network is also described. The method can include performing a lookup operation on a memory of a host node of a communication system to determine if a account should be granted service in a HAC mode of operation. If it is determined that the account should be granted service in a HAC mode of operation, service in a HAC mode of operation is provided.

An audio communication device according to the present invention comprises a transceiver and a processor where the processor can be configured to accept a user selection indicating that a hearing aid compatibility (HAC) mode of operation is desired. The user's selection can be transmitted by the audio communication device to a communication network in order to request a HAC mode of operation.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION

As required, detailed embodiments of the present invention are disclosed herein. It will be understood that the disclosed embodiments are merely examples to illustrate aspects of the invention that may be embodied in various and alternative forms. The figures are not necessarily to scale, and some features may be exaggerated or minimized to show details of particular components. In other instances, well-known materials or methods have not been described in detail to avoid obscuring the present invention. Therefore, specific structural and functional details disclosed herein are not to be interpreted as limiting, but as a basis for the claims and for teaching one skilled in the art to variously employ the present invention.

Figure 1A:
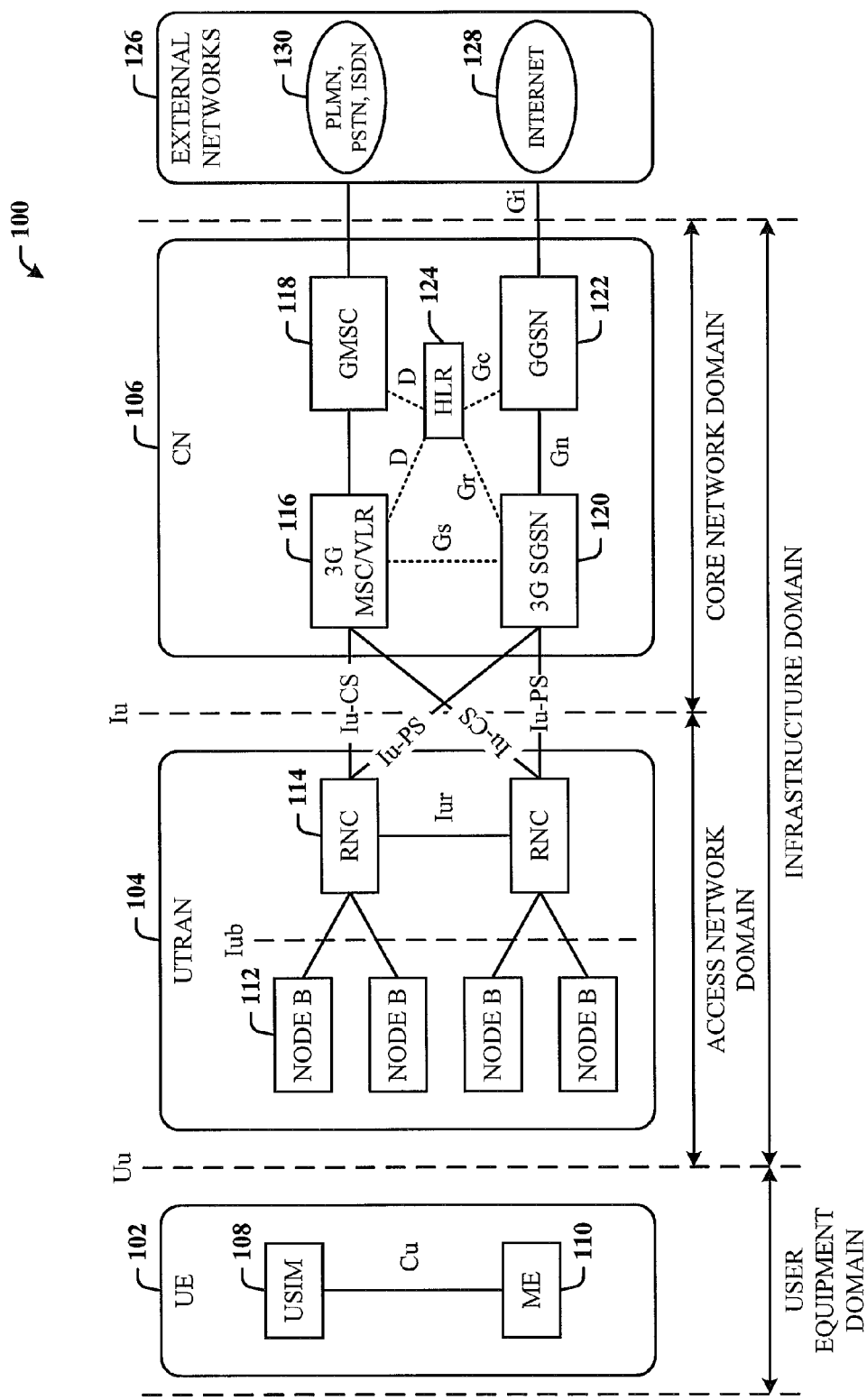
FIGS. 1a and 1b are block diagrams illustrating representative environments in which the present invention may be implemented.

Referring now to the drawings in which like numerals indicate like elements throughout the several views, the drawings illustrate certain of the various aspects of exemplary embodiments of the present invention. FIG. 1a illustrates an exemplary UMTS network 100. The architecture is based on the 3GPP (Third Generation Partnership Project) Release 99 specification. However, it is to be understood that the subject innovation can be applied to any UMTS telecommunications architecture, including by way of example, Release 5 (R5) and Release 6 (R6) 3GPP standards. UMTS offers teleservices (e.g., speech and/or SMS-Short Message Service) and bearer services, which provide the capability for information transfer between access points.

The UMTS network 100 can consist of three interacting domains; a user equipment (UE) domain 102, a UMTS Terrestrial Radio Access Network (UTRAN) domain 104, and a core network (CN) domain 106. The UTRAN domain 104 is also referred to as the access network domain and the CN 106 is referred to as the core network domain, the both of which comprise an infrastructure domain.

The UE domain 102 includes a USIM (user services identity module) domain and an ME (mobile equipment) domain. User equipment is the equipment used by the user to access UMTS services. In the UE domain 102, the UMTS IC card is the USIM 108 which has the same physical characteristics as GSM SIM (subscriber identity module) card. The USIM interfaces to ME 110 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counterpart for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 104 provides the air interface access method for the UE domain 102. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 112, and control equipment for Node-B devices is called a radio network controller (RNC) 114. The interface between the Node-B device and the RNC 114 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a MSC/VLR 116, and GMSC 118. Packet-switched elements include a serving GPRS support node (SGSN) 120 and gateway GPRS support node (GGSN) 122. Some network elements such as an EIR (equipment identity register) (not shown), HLR (home location register) 124, VLR and AuC (authentication center) (not shown) can be shared by both domains.

A function of the CN 102 is to provide switching, routing and transit for user traffic. The CN 102 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 106 interfaces to the radio access domain via an Iu interface. An Iu-CS (circuit-switched) reference point interfaces an RNC of the access network to the MSCNLR entity 116 of the CN 106 for voice from/to the MSCNLR 116. An Iu-PS (packet-switched) reference point interfaces an RNC of the access network to the SGSN entity 120 of the CN 106 for data from/to the SGSN 120.

In the CN 106, a Gs interface is provided between the MSCNLR 116 and the SGSN. A Gn interface is provided between the SGSN 120 and the GGSN 122. A D interface is provided between the MSCNLR 116 and the HLR 124, and the HLR 124 and the GMSC 118. A Gr interface is provided between the SGSN 120 and the HLR 124. A Gc interface is provided between the GGSN 122 and the HLR 124.

The CN 106 provides the interface from the UE domain 102 to external networks 126 such as the Internet 128 via a Gi interface from the GGSN 122, and other networks 130 via the GMSC 118, which can include a PLMN (public land mobile network), PSTN and ISDN (integrated service digital network) networks.

The disclosed invention finds application to EDGE (Enhanced Data rates for GSM Evolution) technology. EDGE is effectively the final stage in the evolution of the GSM standard, and uses a modulation schema that enables theoretical data speeds of up to 384 Kbps within the existing GSM spectrum. EDGE is an alternative upgrade path towards 3G services for operators, without access to a new spectrum.

The architecture of the invention also finds application to a hierarchical cell structure (HCS). HCS is the architecture of a multi-layered cellular network where subscribers are handed over from a macrocell to a microcell, and even further, to a picocell, depending on the current network capacity and the needs of the subscriber.

Prior art solutions to hearing aid compatibility (HAC) issues with wireless communication systems have focused solely or primarily on the UE, its design, and communication parameters under UE control. There are, however, many communication parameters that are not under UE control that can affect the wireless communication system's interference with HA equipment. Other UE settings and parameters are controllable by the UE, but in the context of minimizing HA interference can be better managed by other communication system elements.

Many of the wireless communication parameters associated with UE communications with a RAN are handled by the RAN or CN, as opposed to the UE. Parameters such as communication mode selection (e.g., GSM vs. UMTS vs. WiFi for UE having multiple modes), operating power levels, codec rates for digitized voice data sent between the UE and the network, burst transmission frame length, error correction coding schemes, frequency selection, antenna selection, quality of service (QoS) provided to a given UE, time windows for holding a call before it is released due to high frame errors, and others are generally controlled by the network or the UE is configured to control these parameters according to a process that does not generally permit user control. User control is generally not permitted for these parameters, as this could be disruptive to the efficient operation of the wireless communication network. For example, if a user is permitted to manually control the transmitter power level of their handset, the communication network could not manage the transmitter power to minimize interference between nearby handsets. Likewise, manual control of codec rates could lead to inefficient use of the limited bandwidth available. Therefore, the communication network is generally designed to manage many of the communication parameters associated with communication between UEs and the RAN.

The settings chosen by the network for many of these parameters, individually and in combination, can affect the interference associated with using a audio communication device in concert with a HA. Certain settings can generate relatively high levels of interference, while others tend to minimize interference between a wireless communication network, including its UE, and a HA. The communication network, however, manages these communication parameters without any consideration of how these parameters can affect that interference, in part because the communication network is ignorant of which UE is being used in concert with a HA.

Where a HA user is properly indicated, the network can attempt, within the limitations imposed by current bandwidth availability, to tailor one or more communication parameters to minimize interference at the HA due to the wireless communication network. Using the disclosed system and methods, the potential for a HA user to successfully place a wireless call or use other communication network service are maximized.

The CN 106 can store an indication that a subscriber account is one that will be used with a HA. This indication can comprise a record in a database of a server in the CN 106. For example, the indication can be stored in the host node HLR 124 and/or another database configured to store such data. The indication can comprise an association of an account identifier with an indication that the account will be used with HA equipment. For example, in a GSM or UMTS network, as shown in the examples in Tables 1-3 below, the account identifier can comprise an international mobile subscriber identity (IMSI). The indication that the account will be used with HA equipment can comprise a Boolean value in a column or field of a database table such as a YES, NO, one, zero, check, or no check, for example.

Table 1 shows an example where the IMSI is used as the account identifier and the hearing aid compatibility account (HAC_account) field holds a Boolean value of 1 to indicate that the account will be used with a hearing aid. Alternatively, the indication can comprise a string placed in a column that can be parsed to determine that the string, such as 'HA' for example, is present in the database field. An example of this format is shown in Table 2 below. Other methods of associating a HA indication with a wireless account and storing this information in the wireless communication network are contemplated. The example records shown in the tables below can include additional fields.

TABLE 1

| IMSI | HAC_account |
|---|---|
| 310410123456789 | 1 |

TABLE 2

| IMSI | Features |
|---|---|
| 310410123456789 | xxx,xxx,xxx,HA,xxx,... |

Table 3 below provides an example of a database record which can store an indication that a given subscriber account is authorized to use an HAC mode. Such an indication can be used to permit the subscriber to activate and deactivate an HAC mode for an account. There may be situations where an HAC mode is not desired by a user. For example, the user might not always wear a HA, or the UE might be shared between two or more users all of whom do not wear an HA.

TABLE 3

| IMSI | HAC_authorized |
|---|---|
| 310410123456789 | 1 |

Where the communications network stores an indication that the account is authorized to receive a HAC mode of service, the user of the UE can request that the HAC mode be enabled or disabled for services provided by the network to UE used with the account. The user can set the HAC mode via a menu of the UE, UE soft keys, through a web interface, entering a string of digits or characters via a UE keypad, or other methods. The HAC mode can be set by a user on a call by call basis, on a per service basis, and/or the setting can be stored and remain static until the user changes it.

The wireless communications network operator can require users that desire HAC mode operation of their UE to provide proof that they wear a HA, such as by providing a copy of a HA prescription or other sufficient proof. Because the HAC mode, in some cases, overrides communication parameters normally controlled by the network to manage bandwidth, transmit power (inter UE interference), and quality of service, it is desirable to prevent non-HA users from receiving HAC mode service.

Figure 1B:
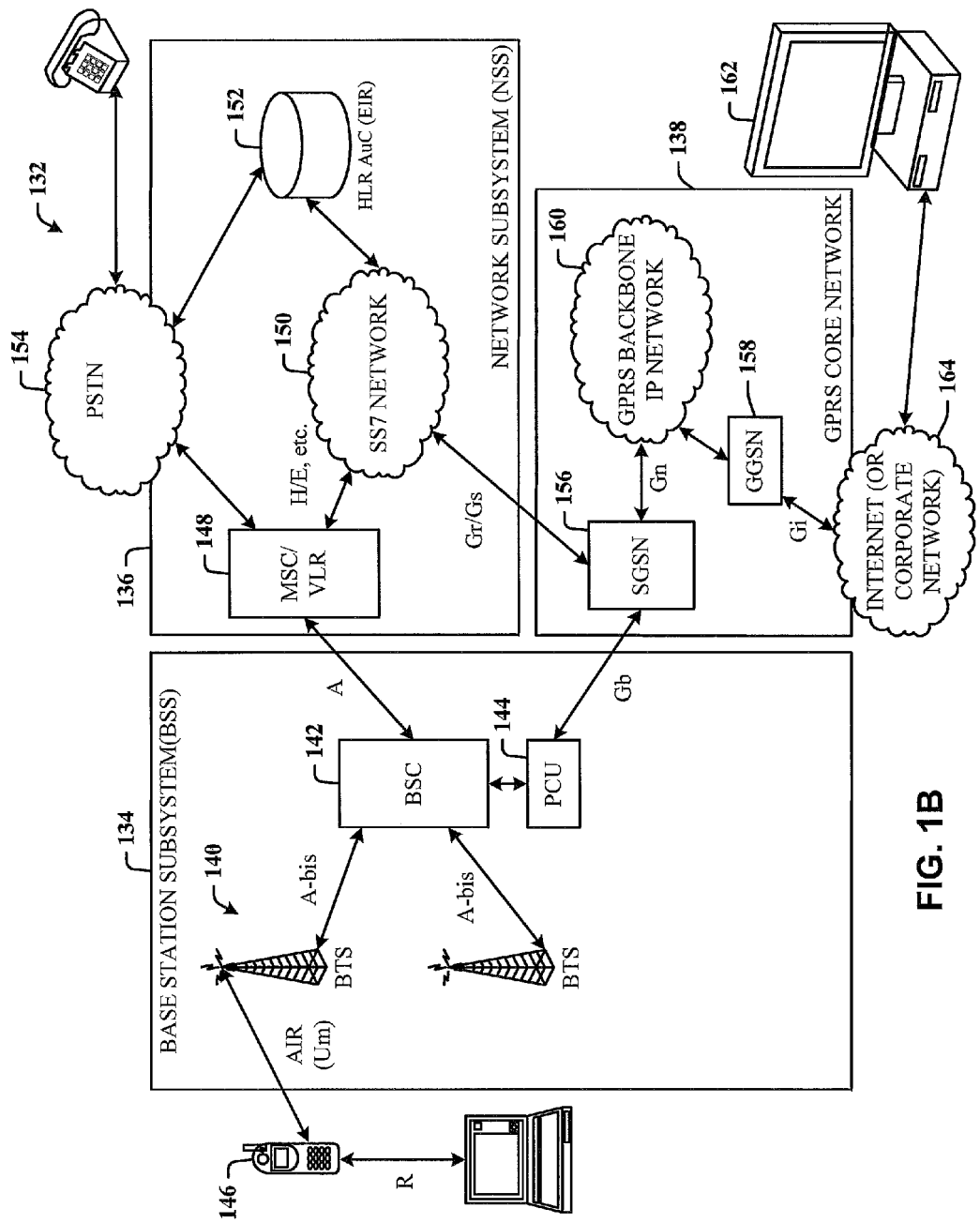

FIG. 1b illustrates an exemplary GSM network that may be used to implement the various aspects of the present invention. The GSM system, designed as a 2G cellular communications system, utilizes time division multiple access (TDMA) technology. Digitally-encoded speech can also be ciphered to retain call privacy. Voice calls are the primary function of the GSM system. To achieve this, a vocoder is used. A vocoder is a voice coder device that usually consists of a speech analyzer and a speech synthesizer. The speech analyzer converts analogue speech waveforms into narrowband digital signals during an encoding process. The speech synthesizer converts or decodes the digital signals into artificial speech sounds.

GSM also supports a variety of other data services, although the performance for such data services (e.g., facsimile videotext and teletext) is relatively slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 132 includes a base station subsystem (BSS) 134, a network subsystem (NSS) 136 and a GPRS core network 138. The BSS 134 can include one or more base transceiver stations (BTS) 140 and a base station controller (BSC) 142 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 144 is shown connected to the BTS 140 although the exact position of this can depend on the vendor architecture. The BSS 134 is connected by the air interface Um to a mobile terminal 146. The BTS 140 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorize the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 142 provides the intelligence behind the BTS 140. Typically, a BSC can have tens or even hundreds of BTSs 140 under its control. The BSC 142 handles allocation of radio channels, receives measurements from the mobile phones, and controls handovers from BTS to BTS (except in the case of an inter-MSC handover in which case control is in part the responsibility of the an MSC). One function of the BSC 142 is to act as a concentrator such that many different low capacity connections to the BTS 140 can become reduced to a smaller number of connections towards the MSC. Generally, this means that networks are often structured to have many BSCs 142 distributed into regions near the BTS 140 which are then connected to large centralized MSC sites.

The PCU 144 can perform some of the equivalent tasks of the BSC 142. The allocation of channels between voice and data can be controlled by the base station, but once a channel is allocated to the PCU 144, the PCU 144 takes full control over that channel. The PCU 144 can be built into the base station, built into the BSC, or even in some architecture, it can be at an SGSN site.

The BSS 134 connects to the NSS 136 by an A interface. The NSS 136 is shown containing an MSC 148 connected via an SS7 network 150 to an HLR 152. The AuC and the EIR, although technically separate functions from the HLR 152, are shown together since combining them can be performed in the network.

The NSS 136 has a direct connection to the PSTN (public switched telephone network) 154 from the MSC 148. There is also a connection to/from the NSS 136 to the GPRS core network 138 via a Gr/Gs interface although this is optional and not always implemented. The illustrated GPRS Core Network 138 is simplified to include a SGSN 156 (connected to the BSS 134 by the Gb interface) and a GGSN 158. The SGSN 156 and the GGSN 158 are connected together by a private IP network 160 called a GPRS backbone shown as the Gn reference point. A computer 162 is depicted as connecting to the core network 138 via an Internet or corporate network 164.

Figure 2:
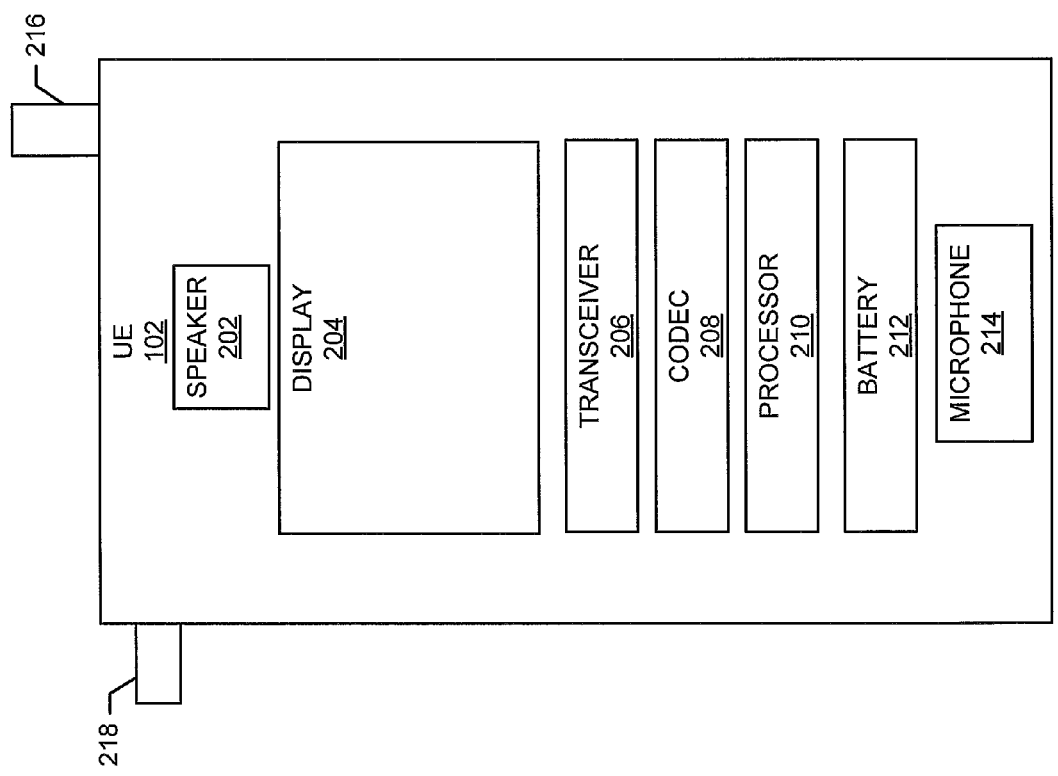
FIG. 2 is a block diagram of a wireless audio communication device according to the present invention.

FIG. 2 illustrates a device (e.g., UE 102) according to the present invention. The UE 102 includes a microphone 214, a speaker 202, battery 212, and a display 204. The UE can further comprise a transceiver 206, a codec 208, and a processor 210. It should be understood that a standalone codec is not required and that, in some embodiments, codec functions can be performed by the processor. The UE 102 can also include one or more antennas 216, 218 for transmitting and receiving signals from the wireless communication network.

Figure 3:
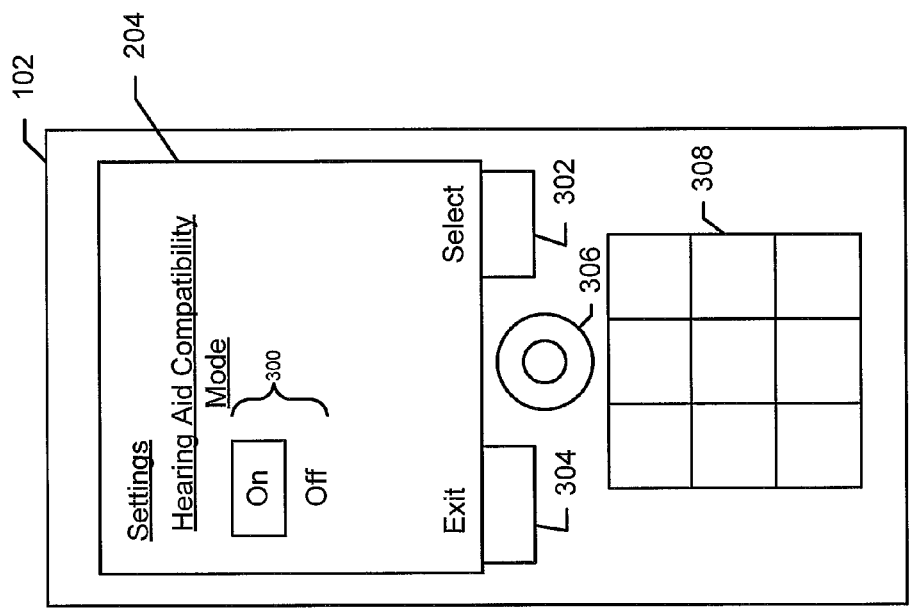
FIG. 3 depicts an interface screen for selecting an HAC mode.

FIG. 3 depicts a user interface screen on display 204 of a UE 102. In the embodiment illustrated, the UE 102 is capable of accepting a HAC mode selection. The interface screen can be reached by navigating a menu 300 of the UE 102 using the directional keys 306, the soft keys 302, 304, and/or the keypad 308. The UE 102 can provide the selection to the communication network upon a change, and/or the selection can be provided to the network upon requesting a network service including not only originating a voice call, but also receiving an incoming call.

FIGS. 4A and 4B depict interface screens that can be used on UE 102 to permit a user to select a HAC mode of operation upon receiving an incoming call or originating a voice call. FIG. 4A shows that an incoming call has been placed to the UE 102 from the number 123-456-7890. An indication is provided above the soft key 302 to accept input from a user of the UE to request that the network and UE connect the call in HAC mode upon the user pressing the soft key 302. FIG. 4B depicts an interface screen 204 of the UE 102, where a call is currently in progress (or has been dialed and is ringing) and where an indication is provided above the soft key 302 to accept input from a user of the UE to request that service for the call be provided to the UE 102 in a HAC mode. Though not illustrated, a similar feature can be provided whereby a user can request HAC mode before initiating a call.

As an alternative to the illustrated embodiment, a dedicated button can be designed on the UE for a "push to HAC" feature implementation. That is, the HAC feature could be enabled by a user by pressing the dedicated button. Such an embodiment is described in more detail in published U.S. Patent Application No. 2007/0009125 to the same assignee.

Figure 5:
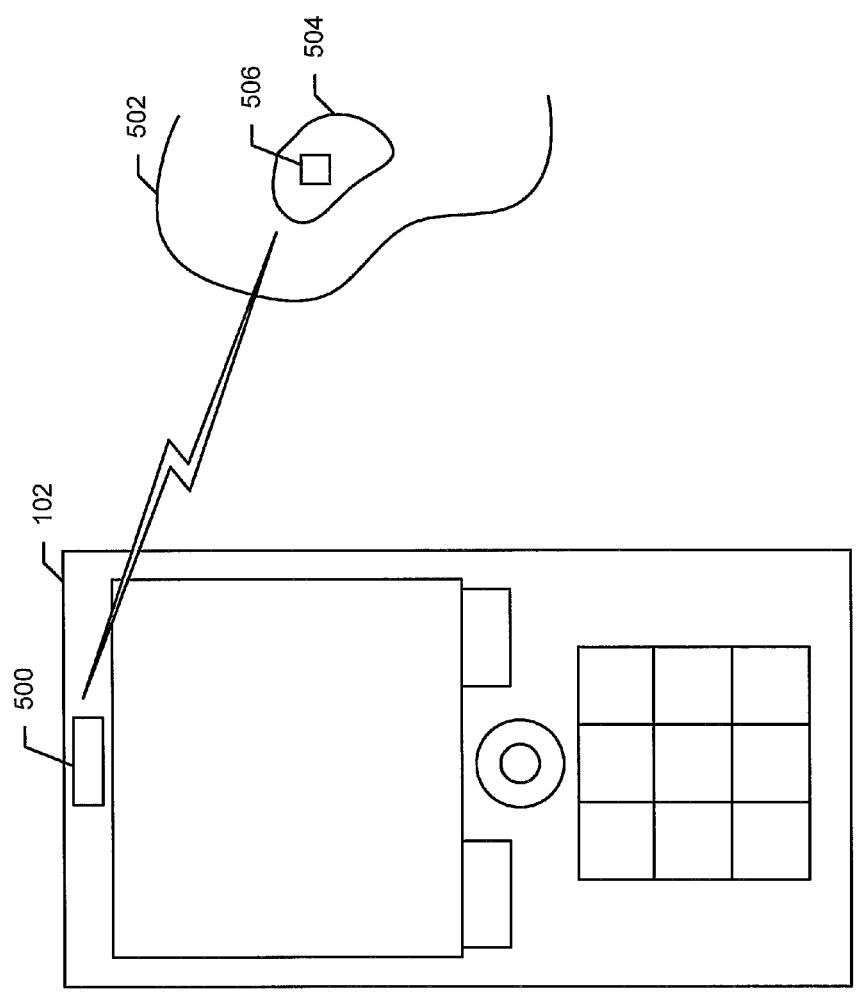
FIG. 5 illustrates a wireless audio communication device having a detector for determining the presence of a hearing aid.

FIG. 5 shows a system that can be used to provide an indication to the UE and on to the communication network, on a call-by-call basis, that the UE is being used with a HA. The UE 102 is shown having a detector 500, which can detect the presence of a tag 506 of the HA 504 of an ear 502 that is brought into proximity to the UE 102. The detector can comprise an RFID reader and the tag 506 can comprise an RFID tag. Although an ITE HA is illustrated, similar systems can be implemented with other HA types.

Figure 4:
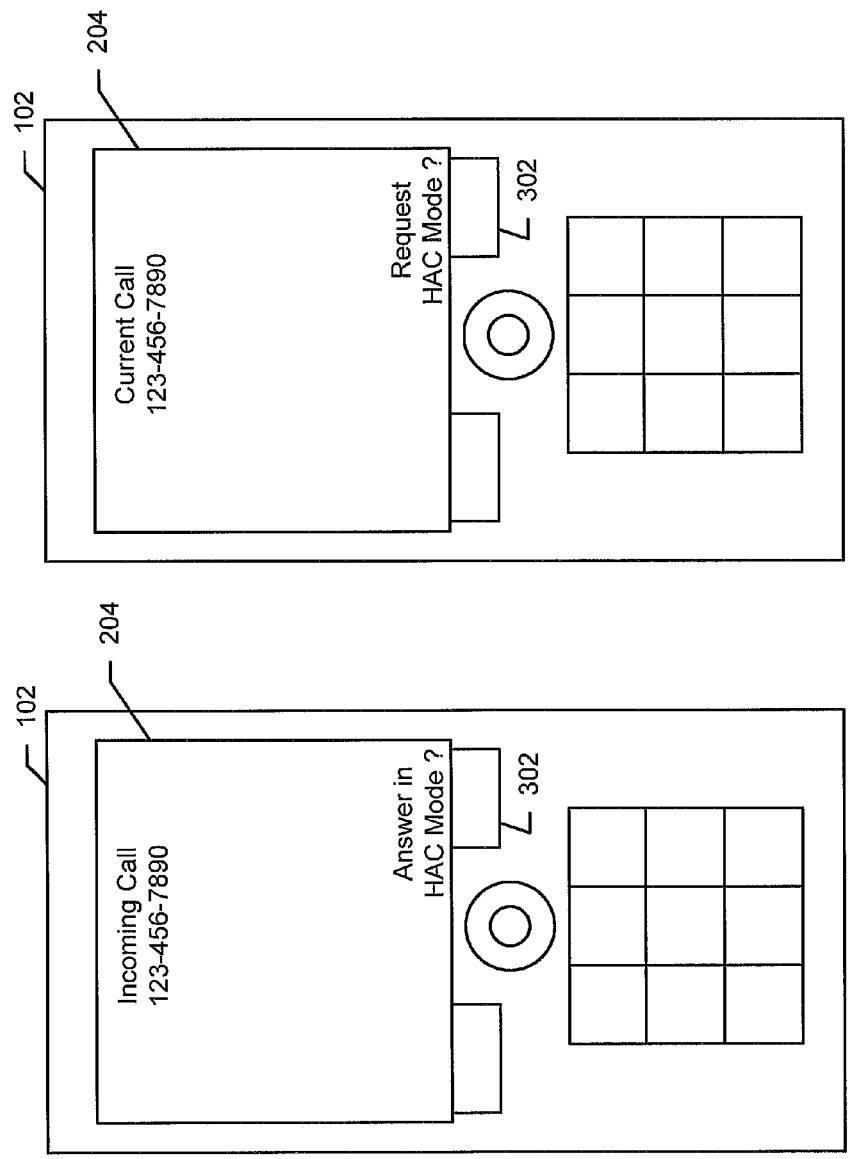
FIG. 4A depicts an interface screen for answering an incoming call in an HAC mode.
FIG. 4B depicts an interface screen for requesting an HAC mode for a call in progress.

In the examples of FIGS. 3-5, settings of the UE, selections by the user, and/or the detection of a HA can be provided to the communications network via an air interface of the communications network. In response the communications network can determine if a HAC mode of operation should be provided to the UE and, if so, can set one or more communication parameters of the network, or instruct the UE to set such parameters in a way so as to minimize the potential for interference of the communications network and/or the UE 102 with a HA of the user.

The system and methods described can be used in providing both circuit switched and packet switched (such as voice over IP (VoIP)) wireless communication services such as voice calls. The coupling mode between a HA and the UE can be microphone, telecoil (magnetic) or both. The disclosed systems and methods are applicable to any of a number of wireless communication standards, including but not limited to GSM, TDMA, iDEN, WiFi, IEEE 802.xx, 802.16, 802.20, UMTS, HSDPA/HSUPA or HSPA, CDMA, EV-DO, UMB, and LTE. The UE can have multiple modes such as a UMTS mode and a WiFi mode. A HAC mode can be configured to select between the multiple modes and may be further configured to prioritize the modes. The invention can also be implemented in a cordless phone network such as a household cordless phone system; in such a system a HAC mode could be indicated by a user through the methods described above or through a physical switch on a handset or a base unit.

With the communication network having knowledge that a wireless account is associated with a hearing aid user and that a HAC mode of operation is to be provided, a number of communication parameters can be manipulated and network resources allocated to attempt to minimize interference with a HA. Where a communication network is experiencing a heavy load, certain parameters or resources might not be available.

Figure 6:
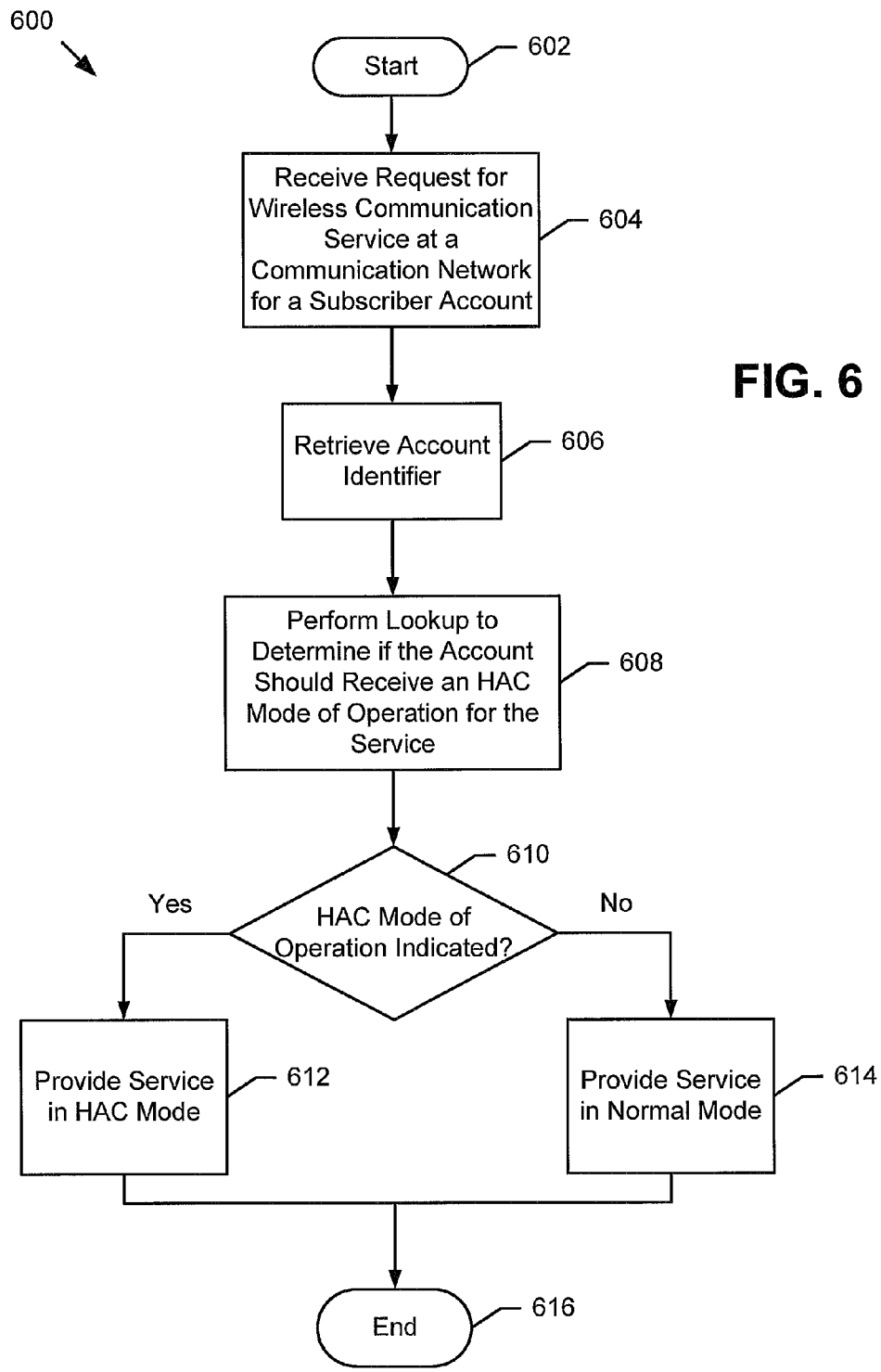
FIG. 6 is a flowchart of a method for providing an HAC mode of operation according to the present invention.

FIG. 6 shows a flowchart depicting a method 600 for providing an HAC mode of operation according to the present invention. The method begins at block 602 and proceeds to block 604 where a request is received at a communication network for wireless communication service for a given subscriber account. At block 606 the account identifier of the request is retrieved. At block 608 a lookup operation is performed to determine if the account should receive an HAC mode of operation for the service to be provided. At decision block 610 if an HAC mode of operation is indicated service can be provided in an HAC mode of operation 612 and the method ends at block 616. If an HAC mode of operation is not indicated for the account, service can be provided in a standard mode of operation at block 614. The method 600 can be used generally where the HAC mode of operation is set for the account and used for services provided to the account until the HAC mode of operation indicator is changed, in contrast to the method 800 of FIG. 8 where the request for HAC service is received on a case by case basis.

Figure 7:
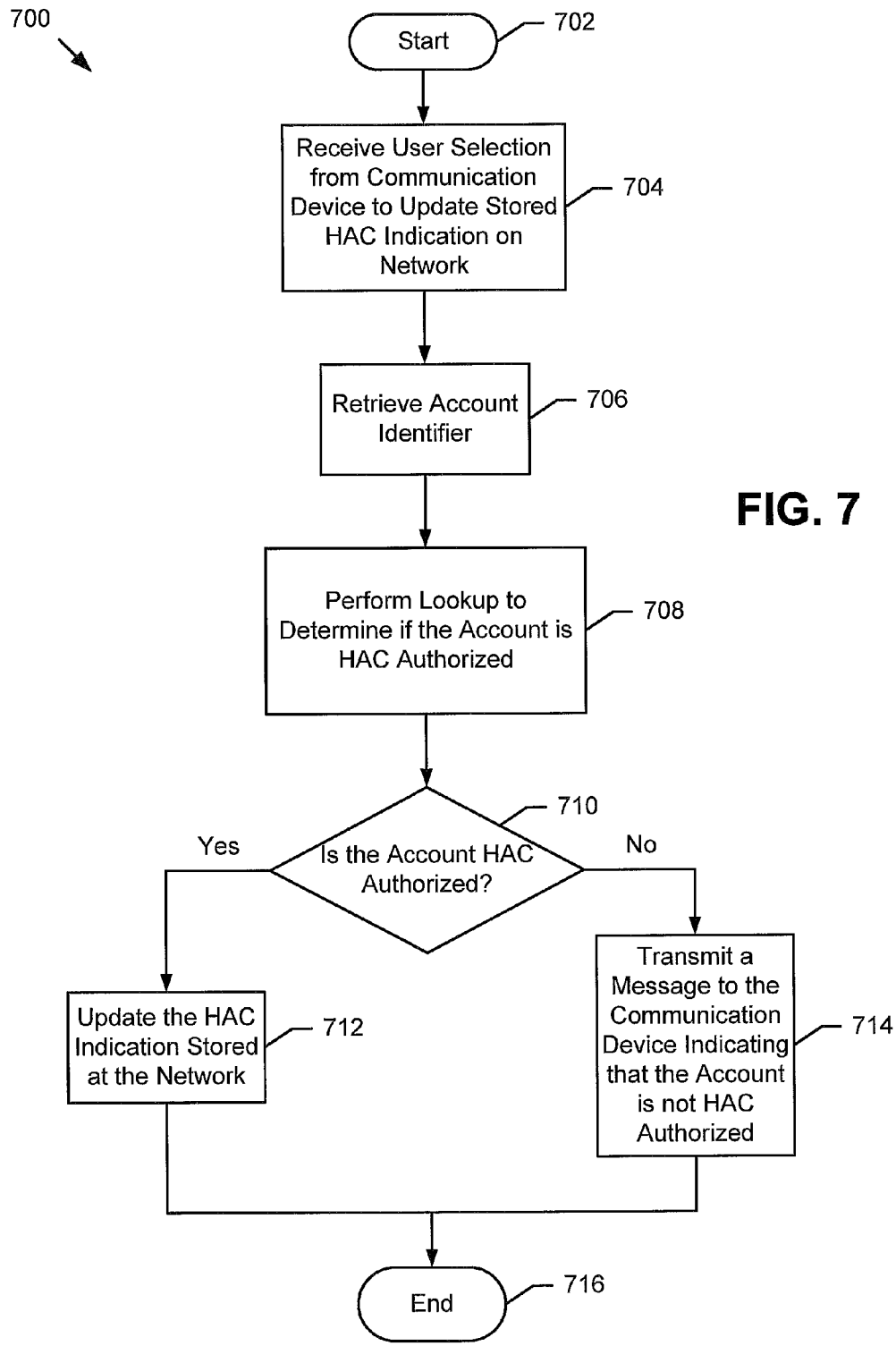
FIG. 7 is a flowchart of a method for updating an HAC indication at a communication network according to a selection made by an account user.

FIG. 7 is a flowchart depicting a method 700 for updating an HAC indication at a communication network according to a selection made by an account user. The method starts at block 702 and proceeds to block 704 where a user selection for an HAC preference is received from a communication device at the communication network. At block 706 the account identifier is retrieved for the subject account. At block 708 a lookup operation is performed to retrieve an HAC authorization indication corresponding to the account. At decision block 710, if the account is HAC authorized the HAC indication stored on the network is updated according to the user selection 712. If the account is not HAC authorized a message is transmitted to the user's audio communication device indicating that the account is not HAC authorized 714. The method ends at block 716.

Figure 8:
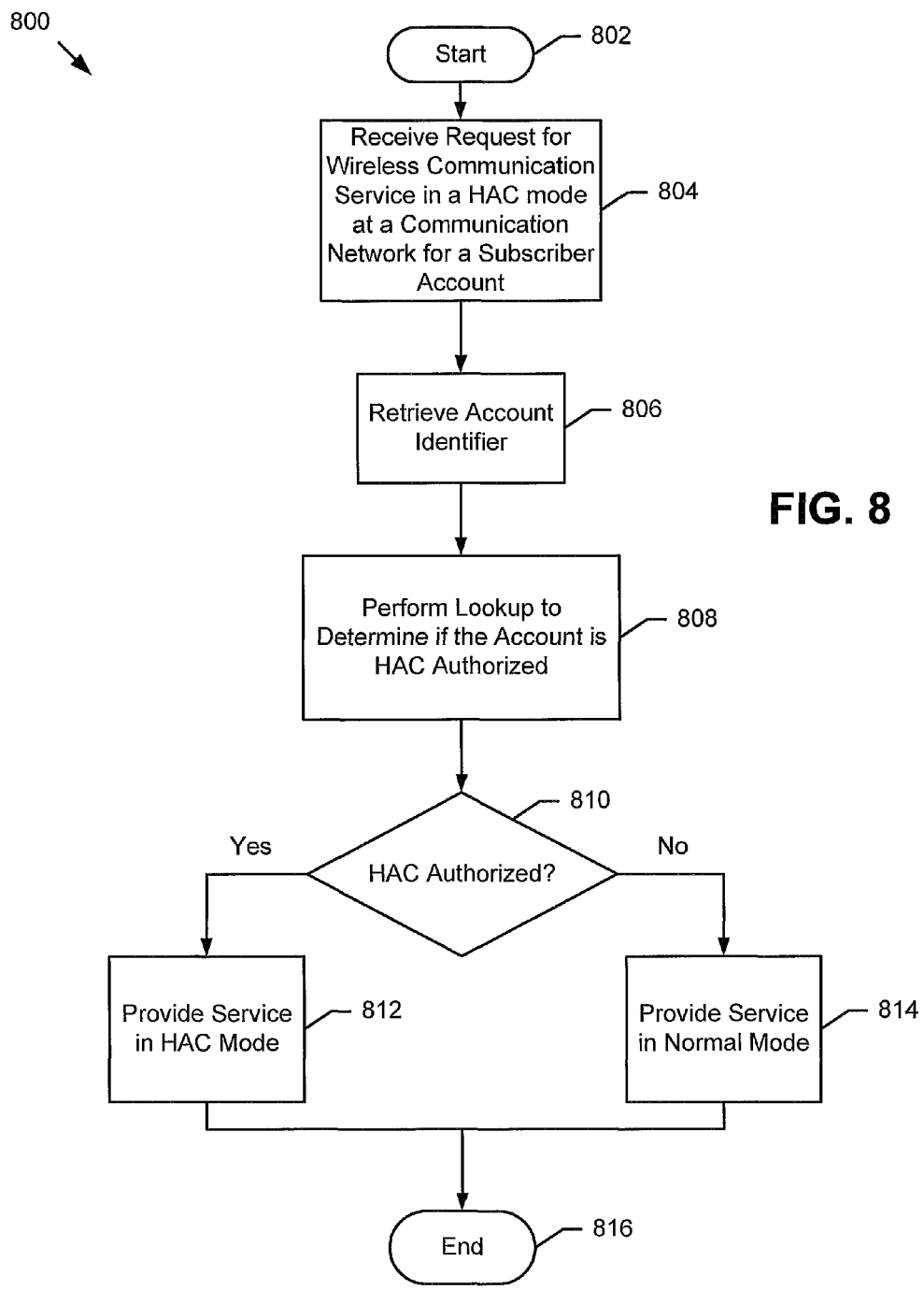
FIG. 8 is a flowchart of a method for providing an HAC mode of operation on a case-by-case basis.

FIG. 8 is a flowchart depicting a method 800 where an HAC authorization indication is stored at the network and requests for a HAC mode of operation are received by the network before or as services are being provided. The method begins at block 802 and proceeds to block 804 where a request is received for wireless communication service in an HAC mode of operation at a communication network. This request can be received, for example, upon an audio communication device initiating a telephone call where a setting has been made in the audio communication device indicating that the user desires an HAC mode of operation. The request can also be received where an audio communication device initiates a telephone call upon pressing a soft key to place the call in an HAC mode. In addition, the method can be used where a user answers an incoming call by pressing a soft key indicating that the user wishes to answer the call in an HAC mode of operation, and/or used where a detector such as the detector 500 of FIG. 5 is used to detect the presence of an HA near the acoustic output of the UE. The method continues to block 806 where the account identifier for the account is retrieved from the request. At block 808 a lookup operation is performed to retrieve the HAC authorization indication for the account. At decision block 810, if the account is HAC authorized, service is provided in an HAC mode at block 812. If the account is not HAC authorized, service is provided in a normal/standard mode at block 814. The method ends at block 816.

Figure 9:
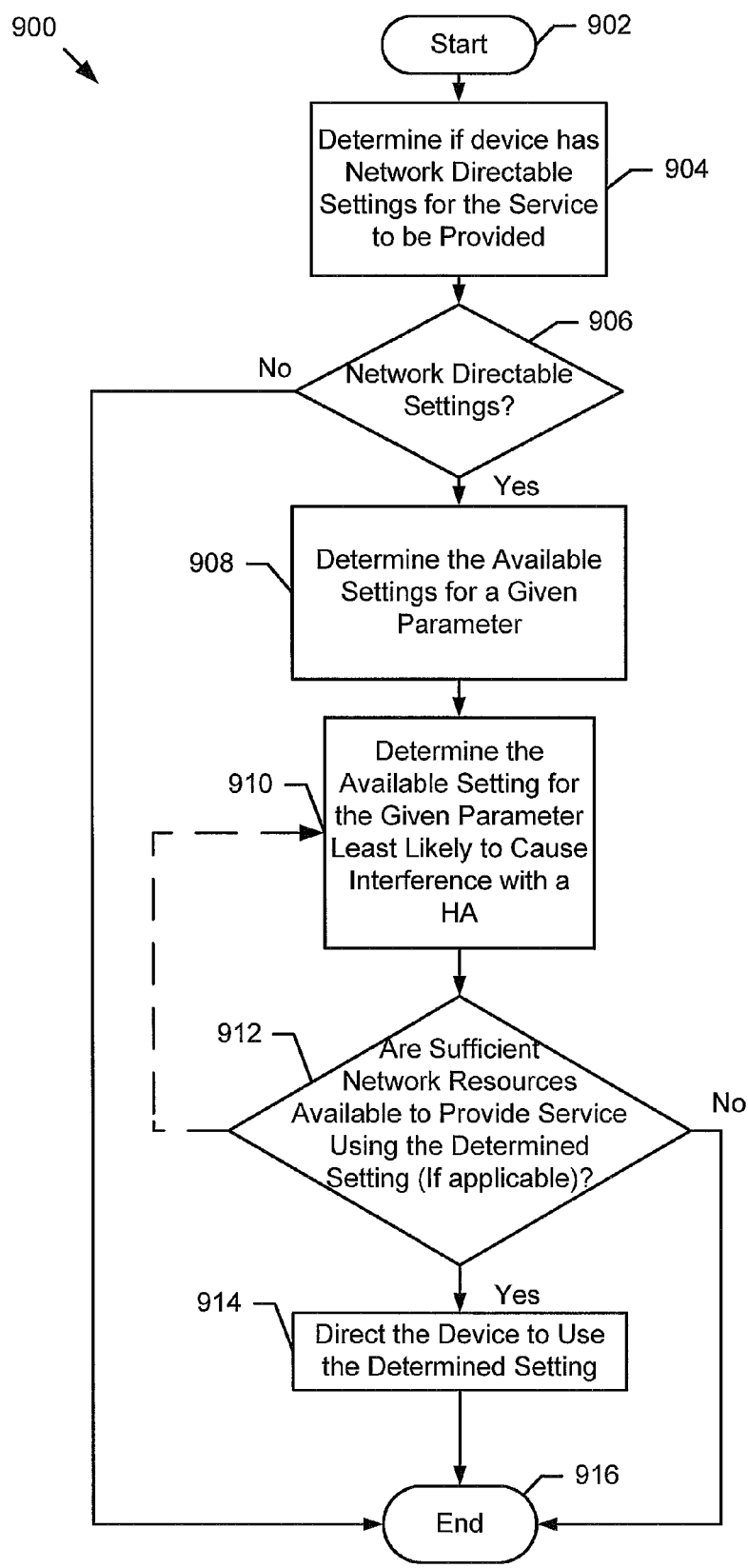
FIG. 9 is a flowchart of a method for a network to manage communication parameters of wireless UE to provide an HAC mode of operation.

FIG. 9 depicts a method 900 for a network to manage communication parameters of wireless UE to provide a HAC mode of operation. The method begins at block 902 and proceeds to block 904 where it is determined whether the UE associated with the account to which service is being provided has network directable settings for the service to be provided. For example, the method can determine if the subject device has multiple codec settings the selection of which can be controlled by the network. The existence of such settings can be presumed in the case of some communication technologies where their existence is part of the communication standard. Where multiple settings for a given parameter are optional in communication devices, the communication network can query the device and/or the network to determine the capabilities of the device. For example, if the device is a GSM/UMTS device an IMEI can be obtained from the device by the network, the network can then query a network memory to determine the capabilities of the device where the memory queried includes IMEIs stored with device capabilities—in a database table, for example. Alternatively, the audio communication device can report its capabilities to the network through the RAN.

If it is determined that the device has no network directable settings for the given communication parameter at decision block 906, the method ends at block 916. If it is determined that the device has network directable settings for the given parameter, the set of available settings can be determined at block 908. The available settings can be determined in a similar way as described above for determining if any directable settings exist. At block 910, the network determines which of the available settings is least likely to cause interference with a HA of the device user. At decision block 912, a check is performed to determine if sufficient network resources exist to provide the service using the determined setting. If such resources exist, the device is directed to use the determined setting at block 914. If sufficient resources do not exist, the method ends at 916. If two or more alternatives exist for the setting as determined at block 908, the method can loop back to block 910 from decision block 912 to determine if a less resource intensive setting can be used to minimize HA interference. This loop back operation is only available if two or more alternatives exist for the setting as determined at block 908 and as such, a dashed loop is illustrated for this case.

If only one setting is available, flow proceeds through each block ultimately directing the device to use the sole setting. If two settings exist, that is a first setting and one alternative setting, then a decision is made at block 910 to determine the available setting for the given parameter least likely to cause interference with a HA. The setting least likely to cause interference with the HA is then used by the device. In some instances, as determined at block 912, network resources are not sufficient to provide service using the selected setting. Accordingly, the method proceeds to block 916 and the method ends. A first setting and one alternative setting can cause the method to default to the remaining setting if the first selected setting does not meet the requirements of block 912.

If three or more setting exist, that is a first setting and at least two alternative settings, then a decision is made at block 910 to determine the available setting for the given parameter least likely to cause interference with the HA. It is then determined, at block 912, if network resources are sufficient to provide service using the selected setting. If network resources are not sufficient, flow proceeds through the dashed loop back to block 910 wherein the remaining settings are analyzed to determine the given parameter least likely to cause interference with the HA. The method repeats until a setting is determined, at block 912, to be sufficient to provide service using the selected setting.

Figure 10:
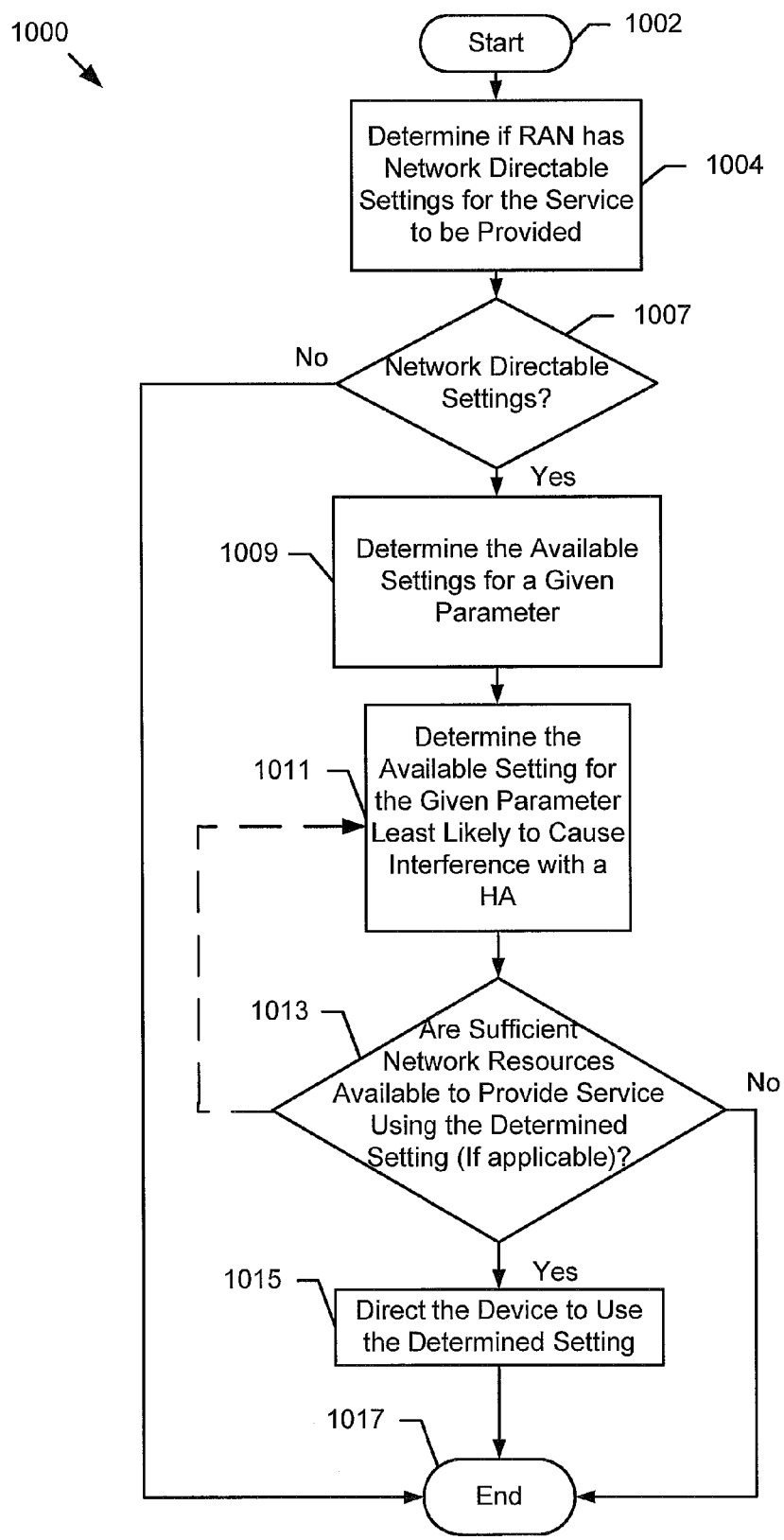
FIG. 10 is a flowchart of a method for a network to manage communication parameters of a RAN to provide an HAC mode of operation.

FIG. 10 depicts a method 1000 for a network to manage communication parameters of a RAN to provide an HAC mode of operation. The method begins at block 1002 and proceeds to block 1004 where it is determined whether the RAN associated with the account to which service is being provided has network directable settings for the service to be provided. For example, the method can determine if the RAN has any steerable antennas which can be used directed toward the location of the UE communicating with the RAN.

If it is determined that the RAN has no network directable settings for the given communication parameter at decision block 1007, the method ends at block 1017. If it is determined that the RAN has network directable settings for the given parameter, the set of available settings can be determined at block 1009. At block 1011, the network determines which of the available settings is least likely to cause interference with a HA of the device user. At decision block 1013 a check is performed to determine if sufficient network resources exist to provide the service using the determined setting. If such resources exist, the RAN is directed to use the determined setting at block 1015. If sufficient resources do not exist, the method ends at 1017. If two or more alternatives exist for the setting as determined at block 1009, the method can loop back to block 1011 from decision block 1013 to determine if a less resource intensive setting can be used to minimize HA interference. This loop back operation is only available if two or more alternatives exist for the setting as determined at block 1009 and, as such, a dashed loop is illustrated for this case.

If only one setting is available, flow proceeds through each block ultimately directing the device to use the sole setting. If two settings exist, that is a first setting and one alternative setting, then a decision is made at block 1011 to determine the available setting for the given parameter least likely to cause interference with a HA. The setting least likely to cause interference with the HA is then used by the device. In some instances, as determined at block 1013, network resources are not sufficient to provide service using the selected setting. Accordingly, the method proceeds to block 1017 and the method ends. A first setting and one alternative setting can cause the method to default to the remaining setting if the first selected setting does not meet the requirements of block 1013.

If three or more setting exist, that is a first setting and at least two alternative settings, then a decision is made at block 1011 to determine the available setting for the given parameter least likely to cause interference with the HA. It is then determined, at block 1013, if network resources are sufficient to provide service using the selected setting. If network resources are not sufficient, flow proceeds through the dashed loop back to block 1011 wherein the remaining settings are analyzed to determine the given parameter least likely to cause interference with the HA. The method repeats until a setting is determined, at block 1013, to be sufficient to provide service using the selected setting.

In many cases the methods 900 and 1000 will be used in combination. That is, a setting directed to the UE will also be directed to the RAN. Where this is the case, the available settings for a given parameter can be corroborated between the two methods to limit the selected setting to one that is shared between the RAN and the UE.

Various communication parameters that can be directed for either or both a UE and a RAN are discussed below. This list is not exhaustive, and the methods of the present invention can be used to manage other parameters not listed in order to provide a HAC mode of operation.

Codec Rate

As a part of a HAC mode provided by a network which is aware of an account being associated with a HA user, the network can instruct the UE and the RAN to operate using an adaptive multi-rate (AMR) speech codec. By way of example, the applicable codec rates 12.2 kbits/s, 10.2 kbits/s, 7.95 kbits/s, 7.4 kbits/s, 6.7 kbits/s, 5.9 kbits/s, 5.15 kbits/s, 4.75 kbits/s, or 1.8 kbits/s as described in $3^{rd}$ Generation Partnership Project (3GPP) 26.071 may be used. Alternatively, other codec rates may be used as required for a specific implementation. In a HAC mode, the network can instruct the UE to maintain higher level codec rates such as 12.2 and 10.2 kbits/s to maintain speech quality and intelligibility.

Burst Frame Length

In a HAC mode, the network can instruct the UE and the RAN to prefer and communicate using longer burst frame lengths for transmissions from the UE to the RAN. For example, a burst frame length of 10 ms can be used instead of a shorter frame length such as 2 ms. The use of the longer frame can reduce potential RF interference into the HA which produces noise in the audible range for human hearing (100 kHz to 4000 kHz).

Error Correction Coding

Mobile networks employ error detection and error correction methods to maintain quality of the speech transmitted during poor RF Signal to Noise connection. Speech information is assembled by the network in speech frames. The quality of the voice channel is typically based on the number of speech frames received and those that are rejected based on the pass/fail of the error detection. The mobile network classifies the quality of the voice call by the number of speech frames rejected and may drop the voice call because of high speech frame error rates. In a HAC mode, the speech quality for a HA user may need to be maintained and in poor RF signal conditions the network may see high speech frame rejections and should not drop the call until the HA user ends the call.

Power Levels

While a HAC mode is being used, the network can instruct the UE to prefer the use of lower power levels between bursts. The reduction of the power level can reduce the RF induced interference into the HA. The power levels can be any as defined by the GSM/UMTS specifications such as provided in 3GPP 34.121. Alternatively, other power levels may be used as required for a specific implementation. In a HAC mode, the network can instruct the UE to limit the RF power to certain power class steps.

Frequency Selection

Where a HAC mode is enabled and the UE being used is capable of operating on various frequency bands, the network can instruct the UE and RAN to prefer one or more of the bands over the others in order to reduce the RF induced interference into the HA.

RAN Antenna Preference

When a HAC mode is enabled, the network can instruct the RAN to prefer steerable antennas or the use of interference cancellation techniques to permit the UE to operate using a lower power output level while still maintaining an acceptable signal to noise ratio for uplink communications.

UE Antenna Preference

Where the UE being used has multiple antennas and a HAC mode is enabled, the network can instruct the UE to transmit from an antenna or multiple antennas where transmitting out of such antennas serves to reduce the electromagnetic field strengths in or near the UE acoustic output (e.g. speaker). For example, the network can direct the UE 102 to transmit from antenna 218 (shown in FIG. 2) instead of antenna 216.

UE Display Settings

The circuitry used to power the backlights of many UE displays can cause interference with a HA. In a HAC enabled mode, the network of the present invention can instruct the UE (a UE according to the present invention which supports this feature) to turn off the backlight and/or disable other display options and processes.

Quality of Service

Where a HAC mode is indicated, the network can allocate resources to the UE according to QoS levels available on the network to reduce the interference into the HA.

Increasing Call Timers

In a HAC mode, the HA user's speech frames may be rejected due to the selection of a higher speech codec rate and error correction in a poor RF signal condition. Where a HAC mode of operation is indicated, the network can increase the timer windows to hold a call longer during periods of high speech frame errors and thus not dropping the call.

Packet Scheduler

Mobile communication networks have been based on Circuit Switched (CS) voice calling. The next generation of mobile communications such as LTE and UWB are planning on introduction of Packet Switched (PS) voice calling such as voice over Internet protocol (VoIP). Unlike circuit switched voice calls the packetized transport of VoIP introduces variable delay due to scheduling of the voice packets through the network. In a HAC mode, the network can prioritize the voice packet to enable a higher Quality of Service (QoS) for the HAC call to limit the amount of delay introduced to maintain a higher speech quality voice call.

Communication Standard

Many newer UE devices include support for multiple communication standards. For example, a UE may include support for both a GSM standard and a WiFi standard allowing the UE connect to wireless access points and place VoIP calls. The methods of the present invention can be used to direct a UE to prefer a WiFi mode of operation where one is available even if a GSM mode of operation would normally be used by the UE in the given circumstances. This can enable to phone to communicate using lower power levels to avoid interference with a HA.

E911 Calls

Where a HAC mode of operation is indicated, the network can further adjust any of the parameters and/or allocate additional resources as discussed herein to give priority to a HA user placing an emergency call.

Network Monitoring of HAC Mode Users at Given Cell

Even where network directable settings exist, the network might not be able to direct that such settings be used due to there consuming extra network resources. In some cases, such additional network resources might not be available. In order to manage these resources, the present invention can monitor a given cell site and its sectors to determine the number of HAC mode users connected to the cell. The methods of the present invention can be used to direct one or more HAC mode users to prefer a connection to another cell or sector where one is available if the number of HAC mode users connected to a given cell is high or the resources available at the cell are low.

As described above, the present invention provides network-oriented methods and systems for addressing the HAC issues. It should be understood that some communication parameters can be interdependent and that, in such cases, some parameters make take priority over others in the network's direction of those parameters.

In addition, the methods and systems are operated on computers and/or computer readable memory or medium, as understood by one skilled in the art.

The law does not require and it is economically prohibitive to and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A communication system, comprising:
a processor; and
a computer-readable medium comprising computer-executable instructions that, when executed by the processor, cause the processor to perform operations, for providing a hearing-aid-compatibility mode of operation, comprising:
receiving, from an audio communication device associated with a user account, a request for the hearing-aid-compatibility mode of operation in connection with a service being or to be provided to the audio communication device;
determining, in response to receiving the request, whether the account is authorized for the hearing-aid-compatibility mode of operation;
enabling, in response to determining that the account is authorized for the hearing-aid-compatibility mode, the hearing-aid-compatibility mode of operation for the account in connection with the service;
determining whether the audio communication device has one or more adjustable, network-directable settings;
identifying, in response to determining that the audio communication device has one or more network-directable settings, one or more available user-device settings of the audio communications device;
determining which of the available user-device settings is least likely to cause interference with a hearing aid being used with the audio communication device, yielding a lowest-interference user-device setting;
determining, in response to determining the lowest-interference user-device setting, whether sufficient network resources exist to provide the service using the lowest-interference user-device setting; and
directing, in response to determining that sufficient network resources exist to provide the service using the lowest-interference user-device setting, the audio communication device to operate according to the lowest-interference user-device setting determined.

2. The communication system of claim 1, wherein the lowest-interference user-device setting is a codec rate.

3. The communication system of claim 1, wherein the lowest-interference user-device setting is a burst frame length.

4. The communication system of claim 3, wherein the burst frame length is optimized for reduced hearing-aid interference.

5. The communication system of claim 1, wherein the lowest-interference user-device setting is a type of error correction coding optimized for a hearing-aid user requirement.

6. The communication system of claim 1, wherein the lowest-interference user-device setting is user-device operating power level optimized for reduced hearing-aid interference.

7. The communication system of claim 1, wherein the lowest-interference user-device setting is an antenna configuration of the device selected to reduce the electromagnetic field inference induced on an acoustic output of the audio communication device.

8. The communication system of claim 1, wherein the lowest-interference user-device setting comprising a display setting, including a display backlighting circuitry optimizable for reduced hearing-aid interference.

9. The communication system of claim 1, wherein the operations further comprise monitoring a number of hearing-aid-compatibility mode users operating at a given location at a given time to prevent over allocation of resources.

10. The communication system of claim 1, wherein the operations further comprise increasing a timer to hold hearing-aid compatibility mode calls to the audio communication device during periods of high frame rate errors.

11. The communication system of claim 1, wherein the operations further comprise providing, to another communication service provider, an indication that the account is using the hearing-aid-compatibility mode to facilitate use of the mode or the audio communication device while the audio communication device is roaming on a network served by the other communication provider.

12. The communication system of claim 1, wherein determining whether sufficient network resources exist to provide the service using the lowest-interference user-device setting includes determining whether currently-available network bandwidth is sufficient to provide the service to the audio communication device with lowest-interference user-device setting.

13. The communication system of claim 1, wherein the operations further comprise determining whether the network has network-directable settings related to provision of the service to the audio communications device.

14. The communication system of claim 13, wherein the operations further comprise:
   identifying network-directable settings related to provision of the service to the audio communications device;
   determining which of the network-directable settings is least likely to cause interference with a hearing aid being used with the audio communication device, yielding a lowest-interference network-device setting;
   determining, in response to determining the lowest-interference user-device setting, whether sufficient network resources exist to provide the service using the lowest-interference network-device setting.

15. The communication system of claim 14, wherein the operations further comprise instructing, in response to determining that sufficient network resources are available to provide the service to the audio communication device with the lowest-interference network-device setting identified, the network to operate according to the network-directable setting identified.

16. The communication system of claim 14, wherein determining whether sufficient network resources are available to provide the service to the audio communication device with the lowest-interference network-device setting determined includes determining whether currently-available network bandwidth is sufficient to provide the service to the audio communication device with the lowest-interference network-device setting.

17. The communication system of claim 1, wherein the lowest-interference user-device setting includes a frequency-band setting.

18. The communication system of claim 14, wherein the lowest-interference network-device setting includes at least one characteristic selected from a group consisting of: a codec rate; a burst frame length; an error correction coding; an operating power level; a frequency band; an antenna configuration; an interference cancellation technique; a quality of service, a call timer setting, packet prioritization.

19. The communication system of claim 1, wherein determining whether the audio communication device has one or more network-directable settings, and identifying one or more available user-device settings of the audio communications device, comprises querying the device to determine device capabilities.

20. The communication system of claim 1, wherein determining whether the audio communication device has one or more network-directable settings, comprises querying the device to determine device capabilities.

21. A computer-readable storage device comprising computer-executable instructions that, when executed by a processor, cause the processor to perform operations, for providing a hearing-aid-compatibility mode of operation, comprising:
   receiving, from an audio communication device associated with a user account, a request for the hearing-aid-compatibility mode of operation in connection with a service being or to be provided to the audio communication device;
   determining, in response to receiving the request, whether the account is authorized for the hearing-aid-compatibility mode of operation;
   enabling, in response to determining that the account is authorized for the hearing-aid-compatibility mode, the hearing-aid-compatibility mode of operation for the account in connection with the account;
   determining whether the audio communication device has one or more adjustable, network-directable settings;
   identifying, in response to determining that the audio communication device has one or more network-directable settings, one or more available user-device settings of the audio communications device;
   determining which of the available user-device settings is least likely to cause interference with a hearing aid being used with the audio communication device, yielding a lowest-interference user-device setting;
   determining, in response to determining the lowest-interference user-device setting, whether sufficient network resources exist to provide the service using the lowest-interference user-device setting; and
   directing, in response to determining that sufficient network resources exist to provide the service using the lowest-interference user-device setting, the audio communication device to operate according to the lowest-interference user-device setting determined.

22. A method, for providing a hearing-aid-compatibility mode of operation, comprising:
   receiving, by a system using a computer processor, from an audio communication device associated with a user account, a request for the hearing-aid-compatibility mode of operation in connection with a service being or to be provided to the audio communication device;
   determining, by the system, in response to receiving the request, whether the account is authorized for the hearing-aid-compatibility mode of operation;
   enabling, by the system, in response to determining that the account is authorized for the hearing-aid-compatibility mode, the hearing-aid-compatibility mode of operation for the account in connection with the account;
   determining, by the system, whether the audio communication device has one or more adjustable, network-directable settings;
   identifying, by the system, in response to determining that the audio communication device has one or more network-directable settings, one or more available user-device settings of the audio communications device;
   determining, by the system, which of the available user-device settings is least likely to cause interference with a hearing aid being used with the audio communication device, yielding a lowest-interference user-device setting;
   determining, by the system, in response to determining the lowest-interference user-device setting, whether sufficient network resources exist to provide the service using the lowest-interference user-device setting; and
   directing, by the system, in response to determining that sufficient network resources exist to provide the service using the lowest-interference user-device setting, the audio communication device to operate according to the lowest-interference user-device setting determined.

* * * * *